United States Patent
Yeturu et al.

(10) Patent No.: US 10,108,695 B1
(45) Date of Patent: Oct. 23, 2018

(54) MULTI-LEVEL CLUSTERING FOR ASSOCIATING SEMANTIC CLASSIFIERS WITH CONTENT REGIONS

(71) Applicant: Amazon Technologies, Inc., Seattle, WA (US)

(72) Inventors: Kalidas Yeturu, Chennai (IN); Anaiappan Govindan, Chennai (IN); Santhoshkumar Manikandasadanam Kalidasa Varier, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 14/816,894

(22) Filed: Aug. 3, 2015

(51) Int. Cl.
G06F 17/30 (2006.01)
G06F 7/00 (2006.01)

(52) U.S. Cl.
CPC .. G06F 17/30598 (2013.01); G06F 17/30011 (2013.01); G06F 17/30876 (2013.01)

(58) Field of Classification Search
CPC ......... G06F 17/30598; G06F 17/30011; G06F 17/30876
USPC .......................................................... 707/739
See application file for complete search history.

(56) References Cited

U.S. PATENT DOCUMENTS

| | | | | |
|---|---|---|---|---|
| 6,101,513 | A * | 8/2000 | Shakib | G06F 17/212 715/234 |
| 6,333,994 | B1 * | 12/2001 | Perrone | G06K 9/222 382/181 |
| 9,516,089 | B1 * | 12/2016 | Ansel | H04L 67/02 |
| 2002/0097909 | A1 * | 7/2002 | Perrone | G06K 9/222 382/187 |
| 2002/0143659 | A1 * | 10/2002 | Keezer | G06F 17/3089 705/27.1 |
| 2004/0119714 | A1 * | 6/2004 | Everett | G06F 17/214 345/471 |
| 2008/0033996 | A1 * | 2/2008 | Kesari | G06F 17/212 |
| 2011/0022599 | A1 * | 1/2011 | Chidlovskii | G06F 17/30247 707/741 |
| 2013/0027752 | A1 * | 1/2013 | Park | H04N 1/4055 358/3.06 |

* cited by examiner

*Primary Examiner* — Pavan Mamillapalli
(74) *Attorney, Agent, or Firm* — Eversheds Sutherland (US) LLP

(57) ABSTRACT

Digital content may be processed to determine a set of containers in the content. Each container may correspond to a particular text element of the digital content such as a line of text on a page of a digital content file. Container data indicating values of base content properties for each container may be obtained. Derived content properties may be determined from the base content properties and values of the derived content properties may be determined for each container. Multiple iterations of a clustering algorithm may be executed, where each iteration involves grouping the containers into a set of clusters by applying a particular distance function to the values of a particular set of base and/or derived properties for each container. The distance function and set of properties utilized at each iteration may be configurable to obtain clusters that can be associated with particular semantic classifiers.

20 Claims, 6 Drawing Sheets

MULTI-LEVEL CLUSTERING FOR ASSOCIATING SEMANTIC CLASSIFIERS WITH CONTENT REGIONS

BACKGROUND

Digital content, such as content that includes text, images, and/or graphics, may be displayed on an electronic device in a variety of different layouts. For example, chapter headings may appear at different locations on different pages, text may be formatted in a variety of different font types and sizes, the text layout of a page that contains an image or graphic (e.g., a table) may differ from the text layout of a page that contains no images or graphics, and so forth.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
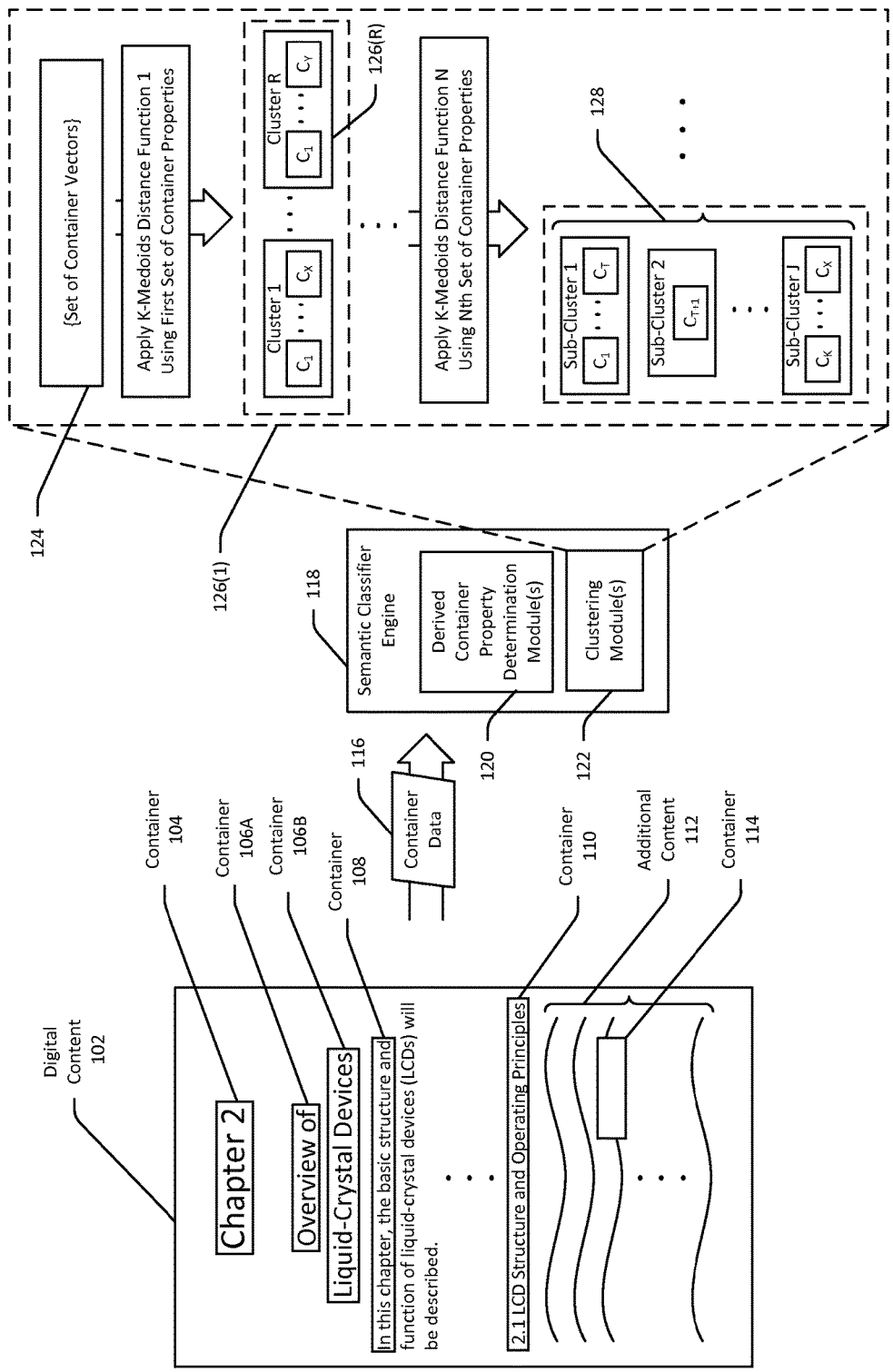
FIG. 1A is a schematic hybrid system, process, and data flow diagram illustrating execution of multiple iterations of a multi-level clustering algorithm in accordance with one or more example embodiments of the disclosure.

This disclosure relates to, among other things, systems, methods, and computer-readable media for determining content elements of a digital content item that correspond to a particular semantic type. More generally, this disclosure relates to systems, methods, and computer-readable media for executing a multi-level clustering algorithm that utilizes a configurable distance function and a configurable set of content properties at each level (iteration) of the algorithm to iteratively generate an increasingly refined set of clusters of content elements. One or more rules associated with one or more content properties capable of differentiating content elements corresponding to a particular semantic type from content elements that do not correspond to the particular semantic type may be applied to a set of clusters outputted by the multi-level clustering algorithm to determine one or more clusters that include more than a threshold number or percentage of content elements that correspond to the particular semantic type.

The digital content item may be, for example, an electronic book (eBook), a portable document format (pdf) file, or the like. The content elements may include, for example, discrete characters, words, or lines of text in a digital content item. A semantic type (also referred to herein as a semantic classifier) may be a logical classification that identifies a relationship of a content element in a digital content item to other content elements in the digital content item. For example, an example semantic classifier may be a chapter heading or a chapter title classifier. All chapter headings/titles within a digital content item (e.g., "Chapter 1," "Chapter 2," "Overview of Liquid-Crystal Devices," etc.)—which are often rendered in larger font sizes and in closer proximity to the top of a page than other text—may correspond to the chapter heading/title semantic classifier. Another example semantic classifier is a footnote classifier. All footnotes within a digital content item—which are often rendered in smaller font sizes and in closer proximity to the bottom of a page—may correspond to the footnote classifier. It should be appreciated that the above examples of semantic classifiers are merely illustrative and not exhaustive.

In certain example embodiments of the disclosure, a pdf document may be processed to identify content regions (also referred to herein as containers) within the pdf document. While example embodiments of the disclosure may be described herein using a pdf document as an example digital content item, it should be appreciated that such example embodiments are applicable to any digital content item that includes text content. Each content region or container may correspond to a rectangular bounding box that encompasses a particular content element. A page of content in a digital content item, such as a pdf document, may be associated with a coordinate grid. Each page coordinate (e.g., (x,y) coordinate) of the coordinate grid may reference a particular location on the page. One or more respective page coordinates may be associated with each content element on a page and may serve to indicate a location of the content element on the page in relation to other content elements on the page. A bounding box may include a set of page coordinates that define a boundary or perimeter around a content element.

Each content element may be a single character or multiple characters that potentially constitute a line of text on a page of the pdf document.

A software tool, such as a software library, may receive the content of the pdf document as input and may parse the content of the pdf document to generate an output indicating a set of containers identified within the pdf document. The output may further indicate values of one or more base container properties for each container. A container property may also be referred to herein as a content property, a feature, or a content feature. For any given container, a base container property (or a base content property) may be the text associated with the container, the font type of the text, the font size of the text, the font color of the text, page coordinates that indicate a location of the container within a page of the pdf document and a size of the container (e.g., height and width), and so forth. The page coordinates may include, for example, (x,y) coordinates of opposing corners of a bounding box corresponding to the container from which a length and a height of the bounding box can be determined.

Various derived container properties may then be determined from one or more of the base container properties. A derived container property (or a derived content property) may be a text-based derived property such as, for example, a property that indicates whether one or more keywords (e.g., "chapter," "glossary," "blank," etc.) are present in the text of a container, a property indicative of a percentage or number of words that are capitalized in the text of a container, a property that indicates whether a numeric character is present in the text of a container, and so forth. Derived container properties may also include geometric properties such as, for example, a page location property that indicates a number or percentage of containers that appear above a particular container on a page, a page grid property indicative of an average font size, an average number of containers, or the like present within a particular grid region on a page sectioned into multiple grid regions, and so forth.

Derived container properties may additionally include frequency-based properties such as, for example, a number of containers on a given page, a number of pages that include at least one container with text of a given font size, a number of pages that include at least one container with text of a given font type, and so forth. Derived properties may also include properties associated with all containers such as, for example, an average font size of all containers. Derived properties may still further include page proximity properties such as, for example, a number of containers within k pages (within a neighborhood) of a page containing a particular container that have the same value for a given property (e.g., same font size, same font type, etc.) as the particular container, a mean or variance of (x,y) coordinates of containers within a page neighborhood that have the same values for a given property, and so forth.

For any given container, a respective value may be associated with each base container property and each derived container property associated with the container. A vector or other data structure of the various property values may be generated for each container. Certain properties may be associated with numeric values. For example, for a particular container, the font size of text of the container (e.g., 24) may be included within the vector. Other numeric values corresponding to properties associated with all containers may also be included in the vector for each container. For example, the average font size of all containers may be included within the vector for each container.

Further, the vector for a particular container may include one or more normalized values for base and/or derived properties. For example, the font size of text within a particular container may be divided by the maximum font size that appears in the pdf document to generate a normalized font size value for the particular container. This normalized font size value may be included in the vector for the particular container. In certain example embodiments, a normalized value generated from a value of a base container property may itself be a derived container property. As another example, the value of a page location property for a particular container may be a normalized value. For example, a number of containers present on a page above a particular container may be divided by the total number of containers on the page to obtain a page location value for the particular container. The page location value may be a normalized value between 0 and 1. This normalized value may be included within the vector for the particular container. A normalized page location value of 0 for the page location property may indicate a "top-most" container on the page. Similarly, a normalized page location value of 1 for the page location property may indicate a "bottom-most" container on the page.

The vector for a particular container may also include one or more binary values corresponding to one or more base and/or derived properties. For example, a range of potential font sizes may correspond to entries within a vector for a container. A binary 1 may be included at a position in a vector of a particular container that corresponds to the font size of text within that particular container. A binary 0 may be included at each other position in the vector that corresponds to a different font size. In addition, a binary value may be generated for a base and/or derived property that does not have an associated numeric value. For example, a vector entry may be provided for each font type of a set of possible font types. For a particular container, the corresponding vector may include a binary 1 for the vector entry that corresponds to the font type of the text in the container and a binary 0 for each other vector entry that corresponds to a different font type. Binary values may also indicate whether a particular keyword is present in text of a container, whether the text of a container is bolded or italicized, whether the text of a container includes a capitalized letter, and so forth. For example, a binary 1 at a particular position in a vector for a container may indicate that a particular keyword is present in the text of the container and a binary 0 may indicate that the particular keyword is not present.

Upon generating a respective vector or other data structure for each container that indicates values assigned to various base and derived properties, a first set of container properties may be selected for consideration during execution of a first iteration of a multi-level clustering algorithm in accordance with example embodiments of the disclosure. The first set of container properties may include any number of base and/or derived properties. The first set of container properties may include, for example, the font size property, the font type property, a property indicative of whether a particular keyword is present in text of a container, a property indicative of whether text of a container is stylized (e.g. bolded, italicized, etc.), and so forth.

A first distance function may also be selected for the first iteration of the multi-level clustering algorithm. In certain example embodiments, the multi-level clustering algorithm may be a K-medoids clustering algorithm. The first distance function may be a Manhattan distance, a Euclidean distance, or the like. The first distance function may alternatively be a non-linear distance function that calculates distances between containers based on a combination of two or more container properties. Two or more properties may be combined using any suitable regular expression that may include multiplication, addition, subtraction, and/or division operations to obtain a distance function. For example, the first distance function may be a multiplication of a page location value and a font size value.

The first iteration of the multi-level clustering algorithm may be executed to generate a first set of clusters. Each cluster in the first set of clusters may include one or more containers from the total set of containers in the pdf document. In those example embodiments in which the multi-level clustering algorithm is a K-medoids algorithm, an initial number of clusters may be chosen and a number of containers equal to the initial number of clusters may be selected as initial medoids. Using the first distance function, a distance may be calculated between each medoid and each non-medoid container in the total set of containers using the corresponding vectors associated with the medoid and the non-medoid container. In certain example embodiments, the first distance function may utilize only those values in the vectors that correspond to the first set of container properties to calculate the distances. For example, if the first distance function is a Euclidean distance function, a Euclidean distance may be calculated between each medoid and each non-medoid container using only those vector values that correspond to the first set of container properties. As another example, if the first distance function is a non-linear distance function such as a multiplication of a page location value corresponding to the page location property and a font size corresponding to the font size property, distances may be calculated using only the vector value for the page location property and the vector value for the font size property for each container. In certain example embodiments, the distances may be obtained from a look-up table of distances.

The first set of clusters may be determined based on the determined distances. In particular, the containers may be partitioned into the various clusters of the first set of clusters such that the intra-cluster distance between the medoid of a cluster and any given non-medoid container within that cluster is less than the inter-cluster distance between any given non-medoid container within that cluster and any medoid of any other cluster. Stated another way, the membership of the various clusters of the first set of clusters may be determined such that a variance ratio of inter-cluster distances to intra-cluster distances is minimized.

Upon determining the first set of clusters, a non-medoid container within each cluster may be swapped with the existing medoid for that cluster and may serve as a new medoid for that cluster. The inter-cluster and intra-cluster distances may be recalculated for each non-medoid container based on the new medoid selections and, if the variance ratio increases, the new medoid selections may be utilized to determine a second set of clusters during a second subsequent iteration of the clustering algorithm. In certain example embodiments, a number of clusters may be specified for the second iteration of the clustering algorithm. In such example embodiments, additional non-medoid containers may be selected as additional medoids for the second iteration of the clustering algorithm. For example, if the number of clusters specified for the first iteration is 20, the number of clusters in the first set of clusters may be 20. If the number of clusters specified for the second iteration is 2, then the second set of clusters outputted by the second iteration of the clustering algorithm may include up to 40 clusters. That is, each cluster in the first set of clusters may be partitioned into two clusters. It should be appreciated, however, that the membership of the second set of clusters (e.g., the containers in each cluster) may differ from the membership of the first set of clusters based on the medoid selections, based on a second distance function, and/or based on a second set of properties utilized during the second iteration of the clustering algorithm. For example, two clusters formed during the second iteration of the clustering algorithm by partitioning a particular cluster of the first set of clusters may include different containers than the particular cluster.

In certain example embodiments, the second distance function and/or the second set of properties utilized for the second iteration of the clustering algorithm may be different from the first distance function and/or the first set of properties utilized for the first iteration of the clustering algorithm. For example, if the total set of containers includes text having two predominant font sizes, and if the font size property is considered during the first iteration of the clustering algorithm, the first set of clusters that results from the first iteration may include clusters that contain both a significant number of containers with chapter heading text and a significant number of containers with non-chapter heading text if the font size of the chapter heading text and the non-chapter heading text is the same or similar. Thus, in order to separate the containers that include chapter heading text into different cluster(s) from the containers that include non-chapter heading text, another property, such as the page location property or the keyword property, may be considered during the second iteration of the clustering algorithm. The page location property or the keyword property may not have been included in the first set of properties. Similarly, the second distance function used for the second iteration of the clustering algorithm may differ from the first distance function used for the first iteration of the clustering algorithm. For example, if both the first distance function and the second distance function are non-linear distance functions, and the second set of properties includes a different combination of properties than the first set of properties, then the second distance function may differ from the first distance function.

Upon determining the second set of clusters, a non-medoid container within each cluster may be swapped with the existing medoid for that cluster, as described above. The inter-cluster and intra-cluster distances may be recalculated for each non-medoid container based on the new medoid selections and, if the variance ratio increases, the new medoid selections may be utilized to determine a third set of clusters during a third iteration of the clustering algorithm. Additional iterations of the clustering algorithm may be executed until a scenario arises in which swapping medoids with any of the other non-medoid containers does not result in an increase in the variance ratio. It should be appreciated that a metric other than the variance ratio may be used to determine whether to cease execution of the clustering algorithm. For example, the sum of all intra-cluster and inter-cluster distances may be used. In other example embodiments, the clustering algorithm may be executed until a threshold number of iterations have been performed.

Upon obtaining a final set of clusters as a result of execution of one or more iterations of the clustering algorithm, one or more rules associated with a particular semantic classifier may be identified and applied to the final set of clusters. A rule associated with a particular semantic classifier may correspond to a particular container property. For example, a rule associated with the font size property may be used to identify cluster(s) that include containers corresponding to the chapter heading semantic classifier. As another example, a page location rule associated with the page location property may be applied in addition to, or as an alternative to, the font size property rule to identify cluster(s) that include containers corresponding to the chapter heading semantic classifier. In certain example embodiments, a property to which a particular rule corresponds may be a same property considered during one or more iterations of the clustering algorithm.

More specifically, application of a rule may include determining one or more threshold values, determining one or more cluster-specific values, and comparing the cluster-specific value(s) to the threshold value(s) to identify one or more representative clusters to associate with the semantic classifier. For example, for the font size property rule, a maximum font size for the pdf document may be determined. The maximum font size may be the maximum font size among all text of all containers. The maximum font size may be a threshold value associated with the font size property rule. An average font size for each cluster may also be determined. The average font size for any given cluster may be the average font size of the text of all containers within that cluster. The average font size for each cluster may be compared to the maximum font size to identify the representative cluster(s). In certain example embodiments, a cluster having an average font size that is closest to the maximum font size among all clusters may be selected as a representative cluster (also referred to herein as an anchor cluster) for the chapter heading semantic classifier. That is, a cluster for which the difference between the maximum font size and the average font size for the cluster is less than the difference between the maximum font size and the average font size of each other cluster may be selected as the anchor cluster.

In certain example embodiments, multiple anchor clusters may be identified. For example, n clusters having corresponding average font sizes that are within a threshold of the maximum font size may be selected as anchor clusters for association with the chapter heading semantic classifier. Further, in certain example embodiments, other threshold value(s) may be used for the font size property rule. For example, a total average font size of all text in all containers of the pdf document may be determined, and this total average font size may be a threshold value for the font size property rule. A cluster having an average font size that is farthest from the total average font size or for which a difference between the average font size and the total average font size exceeds a threshold may be selected as an anchor cluster. It should further be appreciated that multiple threshold values may be used in conjunction with one another to determine anchor cluster(s).

Another example rule associated with the chapter heading semantic classifier may be a page location rule associated with the page location property. As previously noted, a page location value of a page location property for a particular container may be a ratio of a number of containers on a page that are located above the particular container to the total number of containers on the page. A first container may be determined to be located above a second container if a lower-bound y-coordinate of the first container (e.g., a y-coordinate associated with a bottom edge of the first container) is greater than or equal to an upper-bound y-coordinate of the second container (e.g., a y-coordinate associated with an upper edge of the second container). Alternatively, a first container may be determined to be located above a second container if an upper-bound y-coordinate of the first container is greater than an upper-bound y-coordinate of the second container.

For the page location rule, the page location threshold value(s) may include a value of 0 indicative of a top-most container (e.g., a container for which no other containers on the same page are located above the container) and/or a value of 1 indicative of a bottom-most container (e.g., a container for which all other containers on the same page are located above the container). A median page location value, an average page location value, or a maximum page location value may be calculated for each cluster. In particular, a page location value may be determined for each container in a cluster and the median, average, or maximum of the container page location values may be determined for the cluster. The cluster having an associated median page location value, an average page location value, or a maximum page location value that is closest to the threshold value of 1 among all clusters may be selected as an anchor cluster for the chapter heading semantic classifier. Alternatively, n clusters having associated median, average, or maximum page location values within a threshold of the value of 1 may be selected as anchor clusters.

In certain example embodiments, multiple rules associated with a particular semantic classifier such as the chapter heading semantic classifier may be applied to the final set of clusters. A respective weighting coefficient (also referred to herein as a weight) may be applied to each rule. For example, both the font size rule and the page location rule may be applied to the final set of clusters to identify one or more anchor clusters for association with the chapter heading semantic classifier. A first weight may be assigned to the average font size determined for a cluster to generate a first weighted value and a second weight may be applied to the median page location value, the average page location value, or the maximum page location value determined for the cluster to generate a second weighted value. The first weighted value and the second weighted value may then be combined (e.g., summed, multiplied, etc.) to generate a combined weighted value.

The combined weighted value for each cluster (also referred to herein as a score or a rule score) may then be compared to one or more threshold values to determine one or more anchor clusters for association with the chapter heading semantic classifier. In addition, in certain example embodiments, the weights assigned to various rules may be iteratively refined based on cluster purity scores associated with sets of clusters determined via execution of the multi-level clustering algorithm on a ground-truth dataset of containers. For example, if consideration of the font size property at a particular iteration of the clustering algorithm results in a greater increase in the cluster purity score than consideration of the page location property at a different (or the same) iteration of the clustering algorithm, the font size rule may be assigned a higher weight. Cluster purity scores will be described in more detail hereinafter in this disclosure.

It should be appreciated that the font size rule and the page location rule are merely example rules that may be associated with the chapter heading semantic classifier. Additional or different rule(s) associated with different container properties may be applied to the final set of clusters to identify those cluster(s) to be selected as anchor clusters for association with the chapter heading semantic classifier. Further, any number of rules associated with any of a variety of container properties may be applied to the final set of clusters to identify anchor cluster(s) for a particular semantic classifier.

In certain example embodiments of the disclosure, the multi-level clustering algorithm may be executed on a ground-truth dataset associated with a set of test digital content items to determine the distance function and the set of container properties to utilize for each iteration of the algorithm when executing the algorithm for other digital content items. Execution of the clustering algorithm on the ground-truth dataset may allow for refinement of the distance function and the container property selection for each iteration of the algorithm when executing the algorithm to determine those containers in a digital content item that correspond to a particular semantic classifier such as a chapter heading semantic classifier. Further description of the use of the ground-truth dataset to refine the distance function and the container property selection will be described in connection with the chapter heading semantic classifier for illustrative purposes. However, it should be appreciated that the methodology is applicable to any semantic classifier.

The ground-truth dataset may include, for example, respective container data corresponding to each of one or more test digital content items. Each test digital content item may be an eBook, a pdf document (such as an electronic book in pdf format), or the like. The respective container data may include an identification of containers in a corresponding test digital content item and various base container property values for each container. As previously described, one or more derived container property values may be determined from one or more base container property values. Further, as previously described, a vector or other data structure (e.g., a list, an array, etc.) may be generated for each container that includes the base container property and the derived container property values associated with the container.

A candidate distance function and a candidate initial set of container properties may be selected for use in connection with execution of a first iteration of the multi-level clustering algorithm for the respective container data corresponding to each test digital content item. The first iteration of the algorithm may result in a respective first set of test clusters corresponding to each test digital content item. That is, for each test digital content item, a respective first set of test clusters that includes containers of the test digital content item may be generated. The description that follows will describe additional processing of the ground-truth dataset with respect to a particular first set of test clusters corresponding to a particular test digital content item. It should be appreciated that the processing may be extrapolated to each respective first set of clusters associated with each test digital content item.

A respective cluster purity score may be determined for each cluster in the first set of test clusters. The cluster purity score for a particular test cluster may indicate a number or percentage of containers in the particular test cluster that correspond to a particular semantic classifier such as, for example, the chapter heading semantic classifier (e.g., the number or percentage of containers in the particular test cluster that includes chapter heading text). The highest cluster purity score may then be selected as representative of the cluster purity of the first set of test clusters. For example, if the cluster purity score of a particular cluster is 80% (which may indicate that 80% of the containers in that cluster include chapter heading text) and this cluster purity score is highest among all cluster purity scores for all test clusters in the first set of test clusters, 80% may be selected as the cluster purity value for the first set of test clusters.

The cluster purity score for a cluster may be determined based on labels assigned to each container of the test digital content item. In particular, each container of the test digital content item may be assigned a label that indicates whether the container is associated with a particular semantic classifier such as, for example, the chapter heading semantic classifier (e.g., whether the container includes chapter heading text). The containers of a test digital content item may be labeled via manual inspection, for example. When determining the cluster purity score for a particular cluster, each container in the cluster may be analyzed to determine whether the container has been labeled with an identifier indicative of the chapter heading semantic classifier.

In certain example embodiments, the particular test cluster having the highest cluster purity score may include too few containers for the cluster purity score to be representative of the cluster purity of the entire first set of test clusters. In such example embodiments, a page coverage value may be determined for each test cluster in the first set of test clusters. Accordingly, in such example embodiments, the cluster purity score that is selected as being representative of the cluster purity of the first set of test clusters may be the highest cluster purity score among cluster purity scores associated with test clusters that also have associated page coverage values that meet a threshold value. Accordingly, the cluster purity score that is selected as the representative cluster purity of the first set of test clusters may not be the highest overall cluster purity score if that score is associated with a cluster having a page coverage value that does not meet the threshold.

The page coverage value for a cluster may be any suitable metric. For example, in an example embodiment, the page coverage value for a cluster may be a ratio of the intersection of an expected page coverage value associated with a semantic classifier (e.g., the chapter heading semantic classifier) and an actual page coverage value for the cluster to the union of the expected page coverage value and the actual page coverage value.

The expected page coverage value may be the number of pages in the test digital content item that include at least one chapter heading, as determined, for example, based on the labels assigned to the containers. The actual page coverage value may be the actual number of pages that include the containers of the cluster. If the cluster includes too few containers, the page coverage value for the cluster may be low since the intersection of the expected page coverage value and the actual page coverage value may be a small number of pages. Further, as the number of false positives increase in a cluster (e.g., the number of containers that do not correspond to the chapter heading semantic classifier), the page coverage value for the cluster may decrease since the denominator in the ratio described above (e.g., the union of the expected page coverage value and the actual page coverage value) would increase but the numerator would stay the same.

Upon determining a cluster purity score that is representative of the cluster purity of the first set of test clusters, the representative cluster purity score may be assessed to determine whether the candidate distance function and/or the candidate initial set of container properties should be utilized for the first iteration of the clustering algorithm when executing the algorithm in connection with other digital content items (e.g., non-test digital content items). If the representative cluster purity score meets a threshold, the candidate distance function and the candidate initial set of container properties may be selected for the first iteration of the clustering algorithm when executing the algorithm in connection with other digital content items. If the representative cluster purity score does not meet the threshold, a different distance function and/or a different combination of container properties may be selected, and the first iteration of the multi-clustering algorithm may again be executed on the container data for the set of test digital content items. Different distance functions and/or different combinations of container properties may be iteratively selected for executing the first iteration of the clustering algorithm on the ground-truth dataset until a representative cluster purity is attained that meets the threshold.

Additionally, or alternatively, in certain example embodiments, the representative cluster purity score may be used to determine a distance function and/or a combination of container properties to use for a subsequent iteration of the clustering algorithm. For example, if the representative cluster purity score is low for the first set of test clusters generated as a result of the first iteration of the algorithm, a second distance function that is different from the first distance function and/or a second combination of container properties that is different from the initial combination of container properties may be used for the second iteration of the algorithm. The second distance function may be selected based on an expectation that the second distance function has greater discriminatory power than the first distance function. Similarly, the second set of container properties may be selected based on an expectation that the second set of container properties has a greater discriminatory power than the first set of container properties.

For example, the first distance function may be a non-linear combination of the initial set of container properties. The second distance function that is selected may be a non-linear combination of a different set of container properties than the initial set of container properties or a different non-linear combination of the initial set of container properties (e.g., a different regular expression using the same initial set of container properties). The different set of container properties and/or the different non-linear combination of the initial set of container properties may be selected based on an expectation that the selection will result in a greater separation of containers corresponding to a particular semantic classifier (e.g., the chapter heading semantic classifier) and containers not corresponding to the particular semantic classifier into different clusters, thereby generating clusters having greater cluster purity scores.

For example, the page location property alone (or a distance function that utilizes the page location property alone) may not have suitable discriminatory power to segregate containers corresponding to chapter headings into different cluster(s) from containers not corresponding to chapter headings. For example, clusters that include both chapter heading containers and containers with non-chapter heading text (e.g., containers that include the text "this page is intentionally left blank") may result because both types of containers may have similar page location values. In such example embodiments, the font size property may be selected to replace the page location property (or may be used in conjunction with the page location property) in the second set of container properties and may be used along with a linear distance function (e.g., a Euclidean distance, a Manhattan distance, etc.) or along with a non-linear distance function that is a combination of the second set of container properties to refine the clustering during a second iteration of the clustering algorithm. In this manner, the distance function and the container property selection for each iteration of the clustering algorithm may be refined.

In certain example embodiments, rather than being the cluster purity score for a particular cluster, the representative cluster purity score for a set of test clusters may be an average of the cluster purity scores for all clusters in the set of test clusters. Further, in certain example embodiments, a representative page coverage value (e.g., an average of page coverage values for all clusters in a set of test clusters) may be determined and used in conjunction with the representative cluster purity score to refine the distance function and container property selection for each iteration of the clustering algorithm. In addition, in certain example embodiments, respective weights associated with a particular container property may be applied to the representative cluster purity score and the representative page coverage value and may be refined through execution of the clustering algorithm for multiple test digital content items. After the algorithm has been executed for a threshold number of test digital content items and/or a threshold number of iterations, the final weight values may be compared to corresponding threshold values to determine whether the container property and/or a distance function, such as a non-linear function that utilizes the container property, should be selected for a particular iteration of the clustering algorithm when executed for other digital content items.

Referring again to anchor clusters, in certain example embodiments, an anchor cluster associated with a particular semantic classifier may be merged with a neighboring cluster. The neighboring cluster may also be an anchor cluster for the particular semantic classifier. A cluster may be determined to be a neighboring cluster to an anchor cluster if, for example, an overlapping page coverage of the cluster and the anchor cluster meets a threshold value. For example, a first actual page coverage value may be determined for a cluster. The first actual page coverage value for the cluster may indicate the number of pages of a digital content item that include at least one container in the cluster. A second actual page coverage value may be similarly determined for the anchor cluster. An intersection of the two actual page coverage values may then be determined. If the intersection meets a threshold value, the cluster may be determined to be a neighboring cluster of the anchor cluster, and the two clusters may be merged into a single cluster.

For example, a first anchor cluster associated with the chapter heading semantic classifier may include a container that includes text having the keyword "chapter" (e.g., "Chapter 1"). A second anchor cluster associated with the chapter heading semantic classifier may include a container that includes text of a chapter title (e.g., "Overview of Liquid-Crystal Devices"). These containers may have been segregated into different clusters based on the distance functions and sets of container properties used at various iterations of the clustering algorithm. For example, these containers may have been grouped into different clusters because the keyword property was used at one or more iterations of the clustering algorithm, and the keyword "chapter" is present in one container and absent from the other container. In such example embodiments, if the first anchor cluster and the second anchor cluster have overlapping page coverage that satisfies the threshold overlapping page coverage, the first anchor cluster and the second anchor cluster may be merged into a single cluster. In addition, if the specific containers mentioned above appear on the same page, the containers may be logically merged into a single container. Directed links may be assigned to two or more containers that are merged into a single container to indicate an ordering of the containers. The ordering may indicate relative locations of the containers on a page such as, for example, relative page location values for the containers. Various other properties may also be considered when deciding whether to merge containers such as, for example, the distance between the (x,y) coordinates of the containers.

In certain example embodiments, a set of clusters outputted as a result of the execution of one or more iterations of the clustering algorithm may include one or more clusters that primarily include containers corresponding to a particular semantic classifier. For example, one or more clusters that result from execution of the clustering algorithm may have respective cluster purity values that meet a threshold value indicative of a high degree of cluster purity. The output cluster(s) may be used to generate additional digital content, reflow existing digital content based on changes in rendering characteristics (e.g., font type, font size, etc.), and so forth. For example, a cluster that includes containers corresponding to the chapter heading semantic classifier may be used to automatically generate a table of contents from the chapter heading containers. As another example, containers that have been merged into a single cluster corresponding to the chapter heading semantic classifier, and potentially merged into a single container, may be used to determine whether two containers should appear on the same page when rendered. For example, if digital content is reflowed based on a change in rendering characteristics, it may be determined that the text "Chapter 1" corresponding to a first container and the text "Overview of LCD Devices" corresponding to a second container should be rendered on a same page because these containers are included in a merged cluster and/or these containers have been merged into a single container. It should be appreciated that the above examples are merely illustrative and not exhaustive.

Example embodiments of the disclosure provide a number of technical features, technical effects, and improvements to technology. For example, in accordance with example embodiments of the disclosure, one or more iterations of a clustering algorithm may be executed on data associated with digital content using distance functions and/or input properties configurable for each iteration to obtain a set of clusters, where one or more clusters include digital content corresponding to a particular semantic classifier. Accordingly, execution of a clustering algorithm in accordance with example embodiments of the disclosure provides an automated mechanism for identifying content elements in digital content that correspond to a particular semantic classifier. The identified content elements may then be used to generate additional digital content (e.g., automatically generate a table of contents), to ensure that content elements that together constitute a single content element are not rendered on separate pages when digital content is reflowed based on changes in rendering characteristics, and so forth. Thus, a clustering algorithm in accordance with example embodiments of the disclosure provides a computer-based solution that automatically identifies content elements corresponding to a particular semantic classifier to a computer-based problem requiring identification of such content elements without manual inspection. As a result, the computer-based solution of example embodiments of the disclosure provides an improvement to existing content analysis technologies. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

FIG. 1A is a schematic hybrid system, process, and data flow diagram illustrating execution of multiple iterations of a multi-level clustering algorithm in accordance with one or more example embodiments of the disclosure. FIG. 1A will be described hereinafter in conjunction with FIG. 2, which is a process flow diagram of an illustrative method for executing multiple iterations of a multi-level clustering algorithm to obtain a set of clusters of containers in accordance with one or more example embodiments of the disclosure.

Referring to FIG. 1A, example digital content 102 is depicted. The digital content 102 may be a page of a digital content item such as an eBook, a pdf document, or the like. Visual representations of various containers identified on the page 102 are depicted. As previously noted, a software tool such as a software library may receive content of a digital content item as input and may identify containers present in the digital content item. Each container may correspond to a bounding box that contains a content element of the digital content item. The content element may be text that includes one or more characters such as, for example, a line of text on the page 102.

An example container 104 on the page 102 may include the chapter heading text "Chapter 2." Other example containers on the page 102 may include the container 106A that includes the chapter title text "Overview of" and the container 106B that includes the chapter title text "Liquid-Crystal Devices." As described herein, execution of the multi-clustering algorithm may result in a final set of clusters that includes a cluster that includes each of the containers 104, 106A, and 106B based on a high degree of similarity of base and/or derived property values associated with the containers 104, 106A, and 106B. Another example container 108 is depicted that includes a line of text within a paragraph of text. Further, an example container 110 is depicted that includes the chapter sub-heading text "2.1 LCD Structure and Operating Principles." Based on execution of the multi-level clustering algorithm described herein, the container 110 may ultimately be grouped in a final cluster that is determined to be an anchor cluster for the chapter sub-heading semantic classifier based on an application of one or more rules associated with the chapter sub-heading semantic classifier. The page 102 of the digital content item may further include additional content 112 that may include one or more additional containers 114.

FIG. 1A further depicts a semantic classifier engine 118. The semantic classifier engine 118 may be implemented in any combination of software, hardware, and/or firmware. The semantic classifier engine 118 may include one or more modules for performing various functionality associated with determining derived properties, generating base and/or derived property values, generating a vector or other data structure for each container that includes the base and/or derived property values corresponding to that container, executing one or more iterations of a multi-clustering algorithm using a respective distance function and a respective set of container properties configured for each iteration of the algorithm, applying one or more rules associated with a semantic classifier (e.g., the chapter heading classifier) to the final set of clusters obtained as a result of execution of the clustering algorithm, determining anchor cluster(s) corresponding to the semantic classifier, and/or merging two or more clusters into a single cluster. Example modules of the semantic classifier engine 118 that are depicted in FIG. 1A include derived container property determination module(s) 120 and clustering module(s) 122. The functionality associated with these modules will be described in more detail hereinafter.

Figure 2:
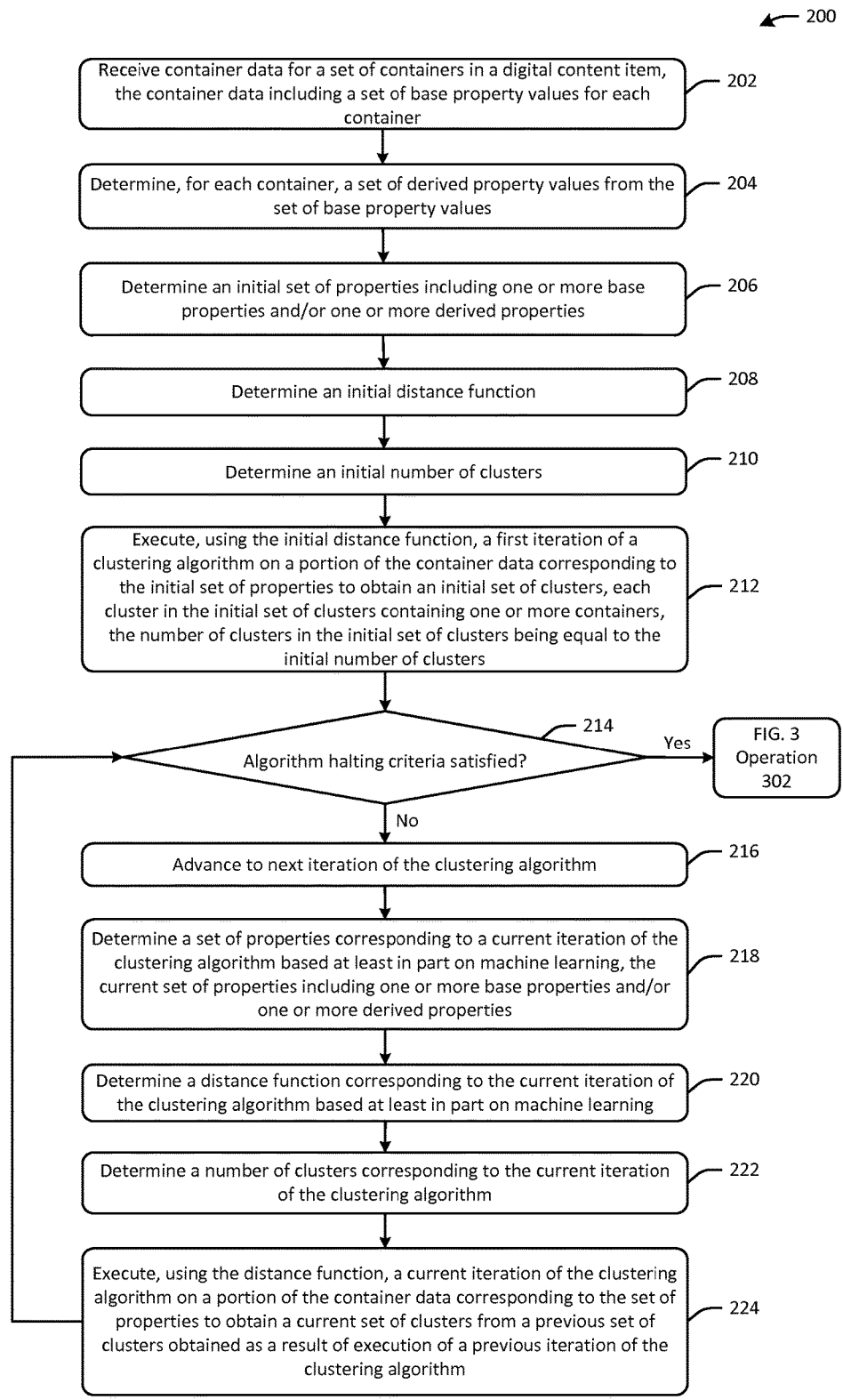
FIG. 2 is a process flow diagram of an illustrative method for executing multiple iterations of a multi-level clustering algorithm to obtain a set of clusters of containers in accordance with one or more example embodiments of the disclosure.

Referring now to FIG. 2 in conjunction with FIG. 1A, at block 202, container data 116 for a set of containers in a digital content item may be received by the semantic classifier engine 118. The set of containers may be identified by a software tool. The set of containers may include the illustrative containers depicted as part of the page 102 as well as containers on each other page of the digital content item. The software tool that identifies the containers may also generate and output the container data 116. The container data 116 may include values of base container properties for each container such as, for example, a font size of text of each container, a font type of the text of each container, a font color of the text of each container, a set of page coordinates for each container, and so forth.

At block 204, computer-executable instructions of the derived container property determination module(s) 120 may be executed to determine a set of derived container properties from the container data 116. A derived container property may be determined from one or more base container properties. The derived container properties may include any of the illustrative derived container properties previously described. Further, at block 204, or as part of a separate operation, computer-executable instructions of the semantic classifier engine 118, or more specifically, computer-executable instructions of one or more modules of the semantic classifier engine 118 such as, for example, the container property value determination module(s) 530 depicted in FIG. 5 may be executed to determine, for each container, values for the derived container properties. In certain example embodiments, a normalized value generated from a base container property value (e.g., a normalized font size) may be a derived container property value. In addition, at block 204, or as part of a separate operation, computer-executable instructions of the container property value determination module(s) 530 may be executed to generate, for each container, a respective container vector or other data structure that includes each of the base container property and derived container property values associated with that container.

At block 206, computer-executable instructions of the clustering module(s) 122 may be executed to determine an initial set of container properties to utilize in connection with execution of a first iteration of the multi-level clustering algorithm on the set of container vectors 124 associated with the containers of the digital content item. The initial set of container properties may include one or more base container properties and/or one or more derived container properties. The initial set of container properties may be determined based on an execution of the clustering algorithm on a ground-truth dataset, as will be described in more detail later in this disclosure in reference to FIG. 4.

At block 208, computer-executable instructions of the clustering module(s) 122 may be executed to determine an initial distance function to use in connection with execution of the first iteration of the clustering algorithm on the set of container vectors 124. The initial distance function may be determined based on execution of the clustering algorithm on the ground-truth dataset. The initial distance function may be a linear distance function such as a Euclidean distance, a Manhattan distance, or the like. Alternatively, the initial distance function may be a non-linear distance function such as a non-linear combination of two or more container properties.

At block 210, computer-executable instructions of the clustering module(s) 122 may be executed to determine an initial number of clusters for the first iteration of the multi-clustering algorithm on the set of container vectors 124. In certain example embodiments, the initial number of clusters may be a predetermined number. In other example embodiments, the initial number of clusters may be based on the size of the container data 116 (e.g., the number of containers), the expected variance in the container property values for the various containers, or the like.

At block 212, computer-executable instructions of the clustering module(s) 122 may be executed to perform, using the initial distance function, the first iteration of the clustering algorithm on a portion of the container data 116 that corresponds to the initial set of container properties. The portion of the container data 116 may include those vector values from each container vector in the set of container vectors 124 that corresponds to the initial set of container properties. Execution of the first iteration of the clustering algorithm may yield an initial set of clusters 126(1)-126(R), where each cluster includes one or more containers from the digital content item.

At block 214, computer-executable instructions of the clustering module(s) 122 may be executed to determine whether halting criteria for halting execution of the clustering algorithm is satisfied. In certain example embodiments, the halting criteria may be a predetermined threshold number of iterations of the algorithm. In such example embodiments, the halting criteria may be determined to be satisfied if the algorithm has been executed the threshold number of times. On the other hand, in response to a negative determination at block 214, the method 200 may proceed to block 216 where the clustering module(s) 122 may advance to the next iteration of the clustering algorithm.

At block 218, computer-executable instructions of the clustering module(s) 122 may be executed to determine a set of container properties corresponding to a current iteration of the clustering algorithm (e.g., a second iteration of the clustering algorithm). In certain example embodiments, the current set of container properties may include at least one base container property and/or derived container property not present in the set of container properties corresponding to a previous iteration of the clustering algorithm. Further, in certain example embodiments, at least one container property present in a set of container properties corresponding to a previous iteration of the clustering algorithm may be absent from the set of container properties corresponding to the current iteration of the clustering algorithm. For example, a second set of container properties corresponding to a second iteration of the clustering algorithm may include at least one property not included among the initial set of container properties and/or the initial set of container properties may include at least one container property not included among the second set of container properties. The set of container properties utilized for the current iteration of the clustering algorithm may have been determined through a machine learning process that includes iterative refinement of the clustering algorithm as a result of execution of the clustering algorithm on a ground-truth dataset corresponding to test digital content items.

At block 220, computer-executable instructions of the clustering module(s) 122 may be executed to determine a distance function corresponding to the current iteration of the clustering algorithm. As with the set of container properties, the distance function corresponding to the current iteration of the clustering algorithm may differ from the distance function corresponding to a previous iteration of the clustering algorithm.

At block 222, computer-executable instructions of the clustering module(s) 122 may be executed to determine a number of clusters corresponding to the current iteration of the clustering algorithm. In certain example embodiments, the number of clusters corresponding to the current iteration of the clustering algorithm may determine a maximum number of clusters that may be formed from each cluster in a set of clusters that results from a previous iteration of the clustering algorithm (e.g., an immediately preceding iteration).

At block 224, computer-executable instructions of the clustering module(s) 122 may be executed to perform, using the distance function determined at block 220, the current iteration of the clustering algorithm on a portion of the container data 116 that corresponds to the set of container properties determined at block 218. The portion of the container data 116 may include those vector values from each container vector in the set of container vectors 124 that corresponds to the set of container properties determined at block 218. Execution of the current iteration of the clustering algorithm may yield a set of clusters, where each cluster includes one or more containers from one or more clusters of a set of clusters produced as a result of a previous iteration of the clustering algorithm. The method 200 may then proceed to the determination at block 214.

The operations 214-224 may be iteratively performed until a positive determination is made at block 214, at which point, the final output of the clustering algorithm is a final set of clusters. This is illustratively depicted in FIG. 1A. For example, an nth iteration of the clustering algorithm (which may be a final iteration) may result in a final set of clusters 128.

Figure 1B:
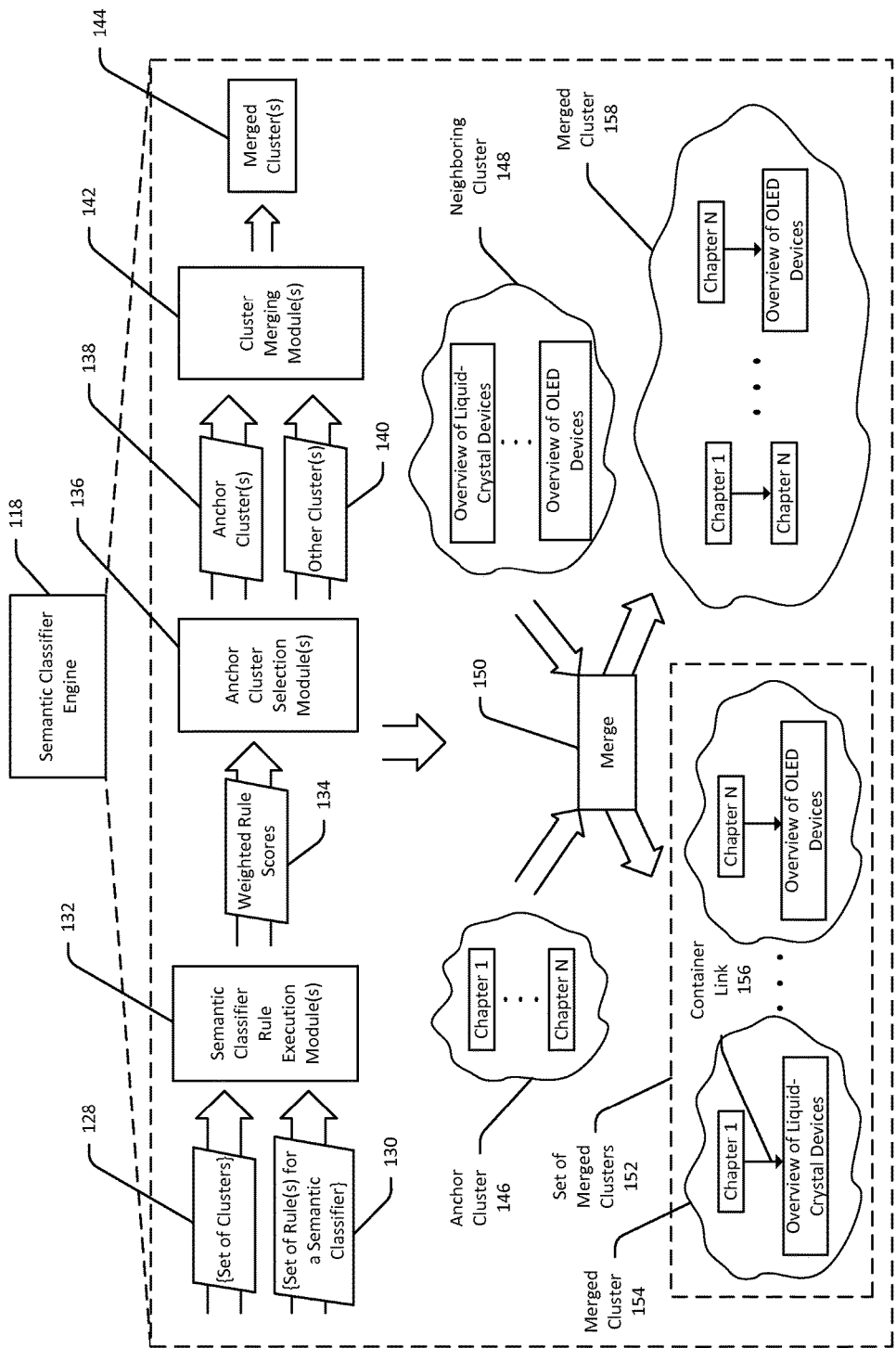
FIG. 1B is a schematic hybrid system, process, and data flow diagram illustrating the identification of a representative cluster including containers corresponding to a particular semantic classifier and the merging of the representative cluster with a neighboring cluster also including containers corresponding to the particular semantic classifier in accordance with one or more example embodiments of the disclosure.

FIG. 1B is a schematic hybrid system, process, and data flow diagram illustrating the identification of a representative cluster including containers corresponding to a particular semantic classifier and the merging of the representative cluster with a neighboring cluster also including containers corresponding to the particular semantic classifier in accordance with one or more example embodiments of the disclosure. FIG. 1B will be described hereinafter in conjunction with FIG. 3, which is a process flow diagram of an illustrative method 300 for identifying a representative cluster including containers corresponding to a particular semantic classifier and merging the representative cluster with a neighboring cluster also including containers corresponding to the particular semantic classifier in accordance with one or more example embodiments of the disclosure.

Referring first to FIG. 1B, the semantic classifier engine 118 may further include one or more semantic classifier rule execution module(s) 132, one or more anchor cluster selection module(s) 136, and one or more cluster merging module(s) 142. The functionality provided by each of these modules will be discussed in more detail hereinafter.

Figure 3:
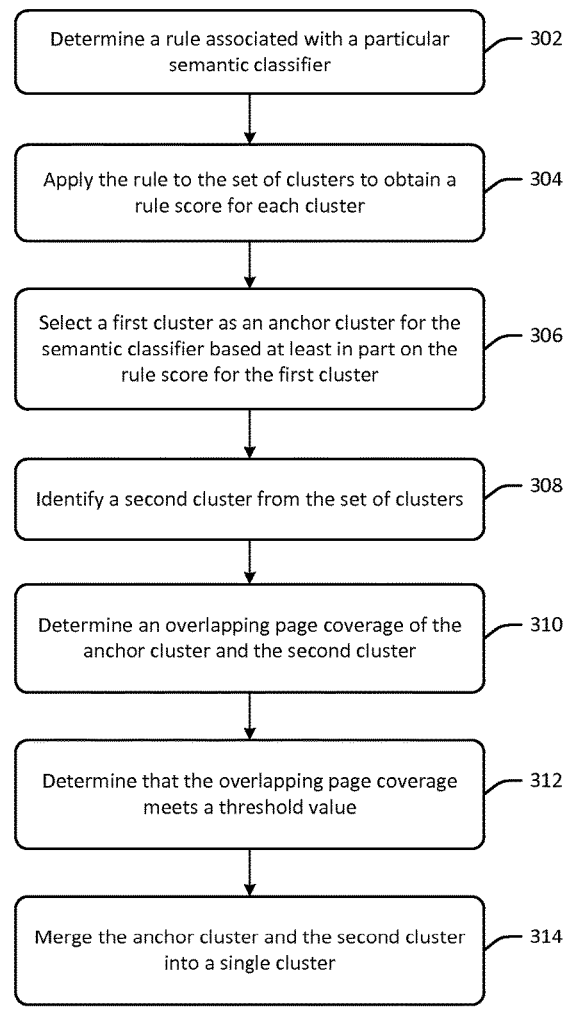
FIG. 3 is a process flow diagram of an illustrative method for identifying a representative cluster including containers corresponding to a particular semantic classifier and merging the representative cluster with a neighboring cluster also including containers corresponding to the particular semantic classifier in accordance with one or more example embodiments of the disclosure.

Referring now to FIGS. 1B and 3 in conjunction with one another, at block 302, one or more rules 130 associated with a particular semantic classifier (e.g., the chapter heading classifier) may be determined. Each semantic classifier rule 130 may correspond to a particular container property identified as having discriminatory power with respect to the semantic classifier. The final set of clusters 128 produced by execution of the clustering algorithm and the set of semantic classifier rule(s) 130 may be provided as inputs to the semantic classifier rule execution module(s) 132.

At block 304, computer-executable instructions of the semantic classifier rule execution module(s) 132 may be executed to apply each of the semantic classifier rule(s) 130 to the set of clusters 128. Application of a semantic classifier rule 130 to the set of clusters 128 may result in a rule score being generated for each cluster. In certain example embodiments, different weights may be assigned to different semantic classifier rules, resulting in weighted rule scores 134 being generated for each cluster with respect to each semantic classifier rule 130. The weighted rule scores 134 may be provided as input to the anchor cluster selection module(s) 136.

At block 306, computer-executable instructions of the anchor cluster selection module(s) 136 may be executed to select an anchor cluster to associate with the semantic classifier from among the set of clusters 128. In certain example embodiments, the anchor cluster may be a cluster having an associated rule score that is closest to a threshold value associated with a semantic classifier rule. In certain other example embodiments, multiple anchor clusters may be selected for association with the semantic classifier. For example, n clusters having associated rule scores that are closest to a threshold value associated with a semantic classifier rule may be selected as anchor clusters. As another example, each cluster having an associated rule score that is within a tolerance of the threshold value associated with a semantic classifier rule may be selected as anchor clusters. Further, in certain example embodiments, each weighted score that is generated for a cluster as a result of application of a different semantic classifier rule corresponding to a particular semantic classifier may be combined to generate a combined score for the cluster. In this manner, a combined score may be generated for each cluster in the final set of clusters 128. The combined scores may then be compared to one or more threshold values to determine the anchor cluster(s). The threshold value(s) to which the combined scores are compared may be generated from a set of threshold values associated with the set of semantic classifier rules 130 associated with the particular semantic classifier. The anchor cluster(s) 138 determined at block 306, or the container data corresponding to the containers included therein, may be provided as input to the cluster merging module(s) 142.

At block 308, computer-executable instructions of the cluster merging module(s) 142 may be executed to identify one or more clusters 140 of the set of clusters 128 other than a particular anchor cluster. A particular cluster of the cluster(s) 140 may or may not itself be an anchor cluster. For ease of explanation, the following description of merging clusters will be described with respect to a first cluster (e.g., an anchor cluster 138) and a second cluster 140 in the set of clusters 128 (which may itself be an anchor cluster 138).

At block 310, computer-executable instructions of the cluster merging module(s) 142 may be executed to determine an overlapping page coverage of the anchor cluster 138 and the second cluster 140. The overlapping page coverage may be a ratio of a number of pages that include both a container from the anchor cluster 138 and a container from the second cluster 140 to the union of the total number of pages that include at least one container from the anchor cluster 138 and the total number of pages that include at least one container from the second cluster 140. At block 312, computer-executable instructions of the cluster merging module(s) 142 may be executed to determine that the overlapping page coverage meets a threshold value. At block 314, computer-executable instructions of the cluster merging module(s) 142 may be executed to merge the anchor cluster 138 and the second cluster 140 to generate a merged cluster 144.

The merging of clusters is illustratively shown in FIG. 1B. For example, the example anchor cluster 146 may be the anchor cluster 138 referred to above and the example neighboring cluster 148 may be the second cluster 140 referred to above. The anchor cluster 146 may include one or more containers, each of which includes chapter heading text that includes the keyword "chapter." The neighboring cluster 148 may include one or more containers, each of which includes chapter title text. Even though a container containing a chapter heading and a container containing a chapter title may both logically correspond to the same semantic classifier (e.g., the chapter heading semantic), they may have been grouped into the different clusters 146, 148 based on the particular set of container properties evaluated as part of execution of the clustering algorithm. Accordingly, the anchor cluster 146 and the neighboring cluster 148 may be merged 150 into one or more merged clusters.

In certain example embodiments, the anchor cluster 146 and the neighboring cluster 148 may be merged into a single merged cluster 158. The single merged cluster 158 may include all of the containers of the anchor cluster 146 as well as all of the containers of the neighboring cluster 148. In other example embodiments, the anchor cluster 146 and the neighboring cluster 148 may be merged into a set of multiple merged clusters 152. An example merged cluster 154 may include a particular container from the anchor cluster 146 (e.g., the container that includes the text "Chapter 1") and a particular container from the neighboring cluster 148 that forms part of a logical grouping with the particular container from the anchor cluster 146 (e.g., the container that includes the text "Overview of Liquid-Crystal Devices"). In certain example embodiments, two or more containers within a given cluster may themselves be merged into a single container. Further, in certain example embodiments, a link (e.g., container link 156) may be generated that indicates an ordering of containers that forms part of the same logical grouping (e.g., containers that form part of a merged container). A directionality of the container link 156 may indicate an order in which the linked containers appear on a page of a digital content item (e.g., relative page location values of the linked containers). It should be appreciated that more than two containers may be merged into a single container and/or linked together to indicate an ordering among the containers.

Figure 4:
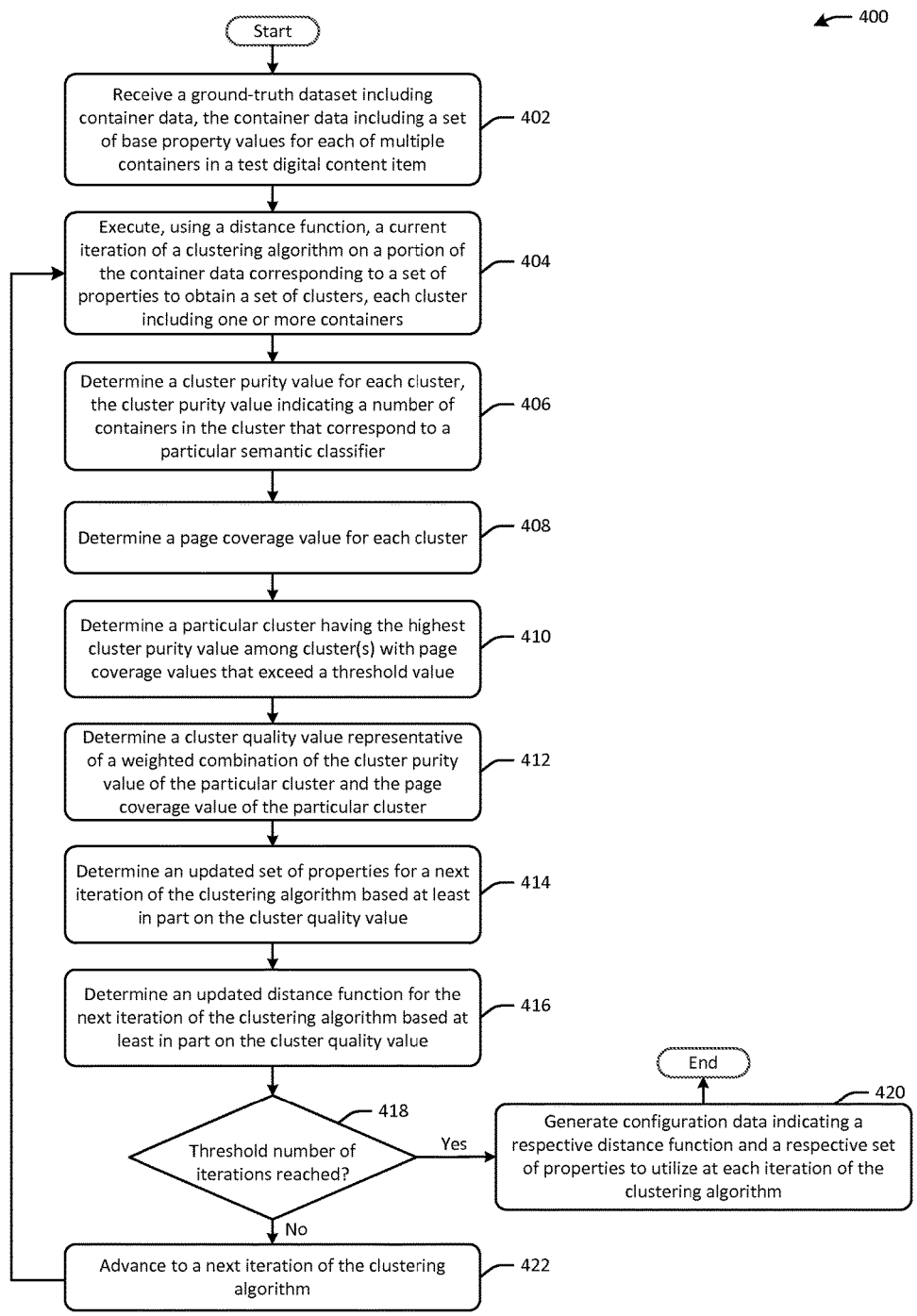
FIG. 4 is a process flow diagram of an illustrative method for using a ground-truth dataset of digital content to determine a respective distance function and a respective set of container properties to utilize for each iteration of a multi-level clustering algorithm in accordance with one or more example embodiments of the disclosure.

FIG. 4 is a process flow diagram of an illustrative method 400 for using a ground-truth dataset of digital content to determine a respective distance function and a respective set of container properties to utilize for each iteration of a multi-level clustering algorithm in accordance with one or more example embodiments of the disclosure.

Figure 5:
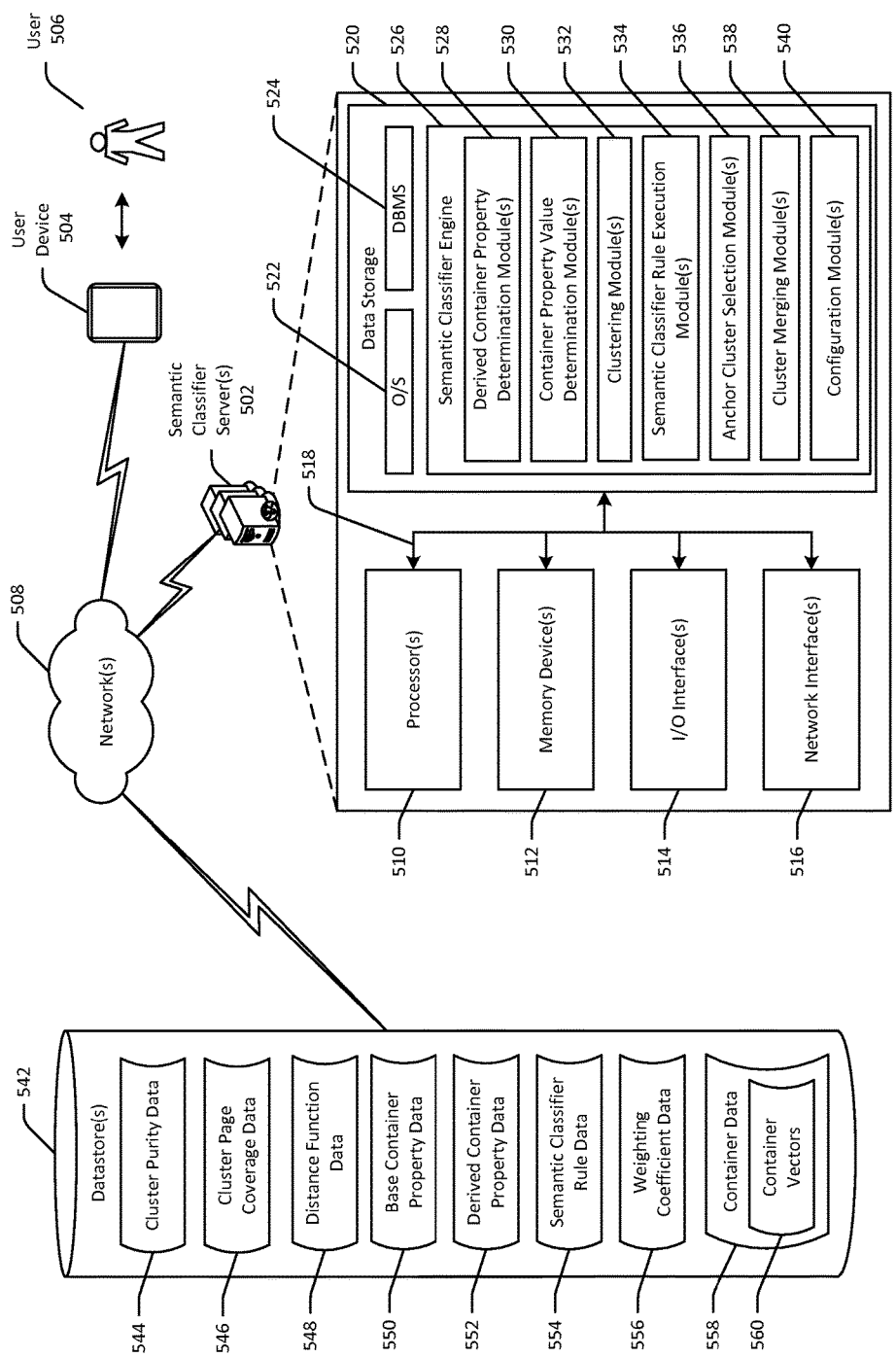
FIG. 5 is a schematic block diagram of an illustrative networked architecture in accordance with one or more example embodiments of the disclosure.

At block 402, a ground-truth dataset may be received by one or more configuration modules 540 (depicted in FIG. 5). The ground-truth dataset may include container data. The container data may include a set of base property values for each of multiple containers in a test digital content item.

At block 404, computer-executable instructions of the configuration module(s) 540 may be executed to perform a current iteration of a clustering algorithm using a distance function. The current iteration may be executed on a portion of the container data corresponding to a set of properties to obtain a set of clusters, where each cluster includes one or more containers.

At block 406, computer-executable instructions of the configuration module(s) 540 may be executed to determine a cluster purity value or score for each cluster. The cluster purity value may indicate a number or percentage of containers in the cluster that correspond to a particular semantic classifier. As previously described, each container in the ground-truth dataset may have been evaluated to determine the semantic classifier to which the container corresponds. Those containers in the ground-truth dataset corresponding to a particular semantic classifier may be assigned a label indicating the particular semantic classifier. Accordingly, the cluster purity value for a cluster may be determined by determining the number or percentage of containers within the cluster that have been assigned a label associated with a particular semantic classifier.

At block 408, computer-executable instructions of the configuration module(s) 540 may be executed to determine a page coverage value for each cluster. The page coverage value for a cluster may be any suitable metric. For example, in an example embodiment, the page coverage value for a cluster may be a ratio of the intersection of an expected page coverage value associated with a semantic classifier (e.g., the chapter heading semantic classifier) and an actual page coverage value for the cluster to the union of the expected page coverage value and the actual page coverage value.

At block 410, computer-executable instructions of the configuration module(s) 540 may be executed to determine a particular cluster having the highest cluster purity value among cluster(s) with page coverage values that exceed a threshold value. At block 412, computer-executable instructions of the configuration module(s) 540 may be executed to determine a cluster quality value representative of a weighted combination of the cluster purity value of the particular cluster and the page coverage value of the particular cluster. At block 414, computer-executable instructions of the configuration module(s) 540 may be executed to determine an updated set of properties for a next iteration of the clustering algorithm based at least in part on the cluster quality value. For example, in certain example embodiments, the cluster quality value may be compared to a threshold value, and if the cluster quality value does not meet the threshold value, at least one property from the set of properties used during a previous iteration of the clustering algorithm on the ground-truth dataset may be excluded from the updated set of properties and/or at least one property not included in the set of properties used during the previous iteration may be included in the updated set of properties. A property to include in or exclude from the updated set of properties may be determined based on an analysis of text of the containers included in the particular cluster.

At block 416, computer-executable instructions of the configuration module(s) 540 may be executed to determine an updated distance function for the next iteration of the clustering algorithm based at least in part on the cluster quality value. The updated distance function may be a linear distance function or a non-linear distance function that may include a different combination of properties than a combination of properties used for a distance function associated with a previous iteration of the clustering algorithm on the ground-truth dataset.

At block 418, computer-executable instructions of the configuration module(s) 540 may be executed to determine whether a threshold number of iterations have been reached. In response to a positive determination at block 418, computer-executable instructions of the configuration module(s) 540 may be executed to generate configuration data indicating a respective distance function and a respective set of properties to utilize at each iteration of the clustering algorithm for subsequent execution of the clustering algorithm on non-test digital content items. In response to a negative determination at block 418, the method 400 may advance to the next iteration of the clustering algorithm at block 422 and may then again proceed from block 404. The operations of blocks 404-418 and 422 may be performed iteratively until a positive determination is made at block 418.

FIG. 5 is a schematic block diagram of an illustrative networked architecture 500 in accordance with one or more example embodiments of the disclosure. The networked architecture 500 may include one or more semantic classifier servers 502, one or more user devices 504, and one or more datastores 542. One or more users 506 may interact with the user device(s) 504. While the semantic classifier server(s) 502 and/or the user device(s) 504 may be referred to herein in the singular, it should be appreciated that multiple ones of any of the illustrative components of the networked architecture 500 may be provided, and any processing described as being performed by a particular component of the networked architecture 500 may be performed in a distributed manner by multiple components.

The semantic classifier server 502 and the user device 504 may be configured to communicate via one or more networks 508. In addition, a first user device 504 may be configured to communicate with a second user device 504 via the network(s) 508 (and potentially via the semantic classifier server 502). The network(s) 508 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 508 may have any suitable communication range associated therewith and may include, for example, global networks (e.g., the Internet), metropolitan area networks (MANs), wide area networks (WANs), local area networks (LANs), or personal area networks (PANs). In addition, the network(s) 508 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the semantic classifier server 502 may include one or more processors (processor(s)) 510, one or more memory devices 512 (generically referred to herein as memory 512), one or more input/output ("I/O") interface(s) 514, one or more network interfaces 516, and data storage 520. The semantic classifier server 502 may further include one or more buses 518 that functionally couple various components of the semantic classifier server 502. These various components of the server 502 will be described in more detail hereinafter.

The bus(es) 518 may include at least one of a system bus, a memory bus, an address bus, or a message bus, and may permit exchange of information (e.g., data (including computer-executable code), signaling, etc.) between various components of the semantic classifier server 502. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 512 of the semantic classifier server 502 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 512 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 512 may include main memory as well as various forms of cache memory such as instruction cache(s), data cache(s), translation lookaside buffer(s) (TLBs), and so forth. Further, cache memory, such as a data cache, may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 512 and the data storage 520, removable and/or non-removable, are examples of computer-readable storage media (CRSM) as that term is used herein.

The data storage 520 may store computer-executable code, instructions, or the like that may be loadable into the memory 512 and executable by the processor(s) 510 to cause the processor(s) 510 to perform or initiate various operations. The data storage 520 may additionally store data that may be copied to the memory 512 for use by the processor(s) 510 during the execution of the computer-executable instructions. Moreover, output data generated as a result of execution of the computer-executable instructions by the processor(s) 510 may be stored initially in the memory 512, and may ultimately be copied to the data storage 520 for non-volatile storage.

More specifically, the data storage 520 may store one or more operating systems (O/S) 522; one or more database management systems (DBMS) 524; and one or more program modules, applications, engines, or the like such as, for example, a semantic classifier engine 526 that may, in turn, include one or more sub-modules or sub-engines including, but not limited to, one or more derived container property determination module(s) 528, one or more container property value determination modules 530, one or more clustering modules 532, one or more semantic classifier rule execution modules 534, one or more anchor cluster selection modules 536, one or more cluster merging modules 538, and one or more configuration modules 540. Any of the modules depicted in FIG. 5 may include computer-executable code, instructions, or the like that may be loaded into the memory 512 for execution by one or more of the processor(s) 510. Each module depicted as part of the semantic classifier server 502 may enable similar functionality as described earlier in connection with similarly named modules. In addition, any data stored in the datastore(s) 542 may be accessed via the DBMS 524, stored in the data storage 520, and loaded in the memory 512 for use by the processor(s) 510 in executing computer-executable code of any of the program modules.

The datastore(s) 542 may include, without limitation, databases (e.g., relational, object-oriented, etc.), file systems, flat files, distributed datastores in which data is stored on more than one node of a computer network, peer-to-peer network datastores, or the like. The datastore(s) 542 may store various types of data such as, for example, cluster purity data 544, cluster page coverage data 546, distance function data 548, base container property data 550, derived container property data 552, semantic classifier rule data 554, weighting coefficient data 556, and container data 558. The container data may include, for example, container vectors 560.

The cluster purity data 544 may include cluster purity scores or values for different clusters obtained as a result of executing a clustering algorithm on a ground-truth dataset. The cluster purity data 544 may further include combined cluster purity scores or values for a set of clusters. The cluster page coverage data 546 may include cluster page coverage values for various clusters. The cluster page coverage data 546 may similarly be obtained as a result of execution of a clustering algorithm on a ground-truth dataset. The distance function data 548 may include data specifying one or more linear distance functions and/or one or more non-linear distance functions to be used during various iterations of the clustering algorithm. The base container property data 550 may include base container property values for various containers of one or more digital content items. The derived container property data 552 may include derived container property values that may be calculated from base container property values and/or values calculated for derived properties that are derived from base container properties. The semantic classifier rule data 554 may include data indicative of one or more rules to apply to a set of clusters to determine one or more anchor clusters to select as representative cluster(s) for a semantic classifier. The weighting coefficient data 556 may include data that specifies one or more weighting coefficients to apply to one or more semantic classifier rules and/or weight coefficient(s) to apply to cluster purity score(s) and/or page coverage value(s). The container data 558 may include data associated with containers identified within digital content items such as, for example, text of the containers, base property values, etc. The container vectors 560 may include vectors or other data structures of base and/or derived property values for various containers. Any data stored in the datastore(s) 542 may be generated by the semantic classifier server 502 and/or the user device 504. Further, any data stored in the datastore(s) 542 may be generated by one component of the networked architecture 500, stored in the datastore(s) 542, and retrieved from the datastore(s) 542 by another component of the networked architecture 500.

The processor(s) 510 may be configured to access the memory 512 and execute the computer-executable instructions loaded therein. For example, the processor(s) 510 may be configured to execute computer-executable instructions of the various program modules of the semantic classifier server 502 to cause or facilitate various operations to be performed in accordance with one or more embodiments of the disclosure. The processor(s) 510 may include any suitable processing unit capable of accepting data as input, processing the input data in accordance with stored computer-executable instructions, and generating output data. The processor(s) 510 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 510 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 510 may be capable of supporting any of a variety of instruction sets.

Referring now to other illustrative components depicted as being stored in the data storage 520, the O/S 522 may be loaded from the data storage 520 into the memory 512 and may provide an interface between other application software executing on the semantic classifier server 502 and the hardware resources of the semantic classifier server 502. More specifically, the O/S 522 may include a set of computer-executable instructions for managing the hardware resources of the semantic classifier server 502 and for providing common services to other application programs (e.g., managing memory allocation among various application programs). The O/S 522 may include any operating system now known or which may be developed in the future including, but not limited to, any server operating system, any mainframe operating system, or any other proprietary or non-proprietary operating system.

The DBMS 524 may be loaded into the memory 512 and may support functionality for accessing, retrieving, storing, and/or manipulating data stored in the memory 512 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository.

Referring now to other illustrative components of the semantic classifier server 502, one or more input/output (I/O) interfaces 514 may be provided that may facilitate the receipt of input information by the semantic classifier server 502 from one or more I/O devices as well as the output of information from the semantic classifier server 502 to the one or more I/O devices. The I/O devices may include, for example, one or more user interface devices that facilitate interaction between a user and the semantic classifier server 502 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The semantic classifier server 502 may further include one or more network interfaces 516 via which the semantic classifier server 502 may communicate with any of a variety of other systems, platforms, networks, devices, and so forth. Such communication may occur via any of the one or more network(s) 508.

The user device(s) 504 may any suitable user device including, but not limited to, a laptop or desktop computer, a tablet device, a smartphone, a content streaming device, a wearable computing device, or the like. The user device 504 may include components corresponding to any of the illustrative components depicted as part of the semantic classifier server 502.

It should be appreciated that the program modules, applications, computer-executable instructions, code, or the like depicted in FIG. 5 as being stored in the data storage 520 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the semantic classifier server 502, locally on the user device 504, and/or hosted on other computing device(s) accessible via one or more of the network(s) 508, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or a greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that any of the components of the networked architecture 500 may include alternate and/or additional hardware, software, or firmware components beyond those described or depicted without departing from the scope of the disclosure. More particularly, it should be appreciated that software, firmware, or hardware components depicted or described as forming part of the semantic classifier server 502 and/or the user device 504 are merely illustrative and that some components may not be present or additional components may be provided in various embodiments. While various illustrative program modules have been depicted and described as software modules stored in the data storage 520, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of the software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 200-400 described earlier may be performed by one or more program modules, applications, or the like executing on the semantic classifier server 502 or by one or more program modules, applications, or the like executing on one or more user devices 504. It should further be appreciated that any of the operations of the methods 200-400 may be performed, at least in part, in a distributed manner by one or more semantic classifier servers 502 and one or more user devices 504, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 200-400 may be performed in the context of the illustrative configuration of the semantic classifier server 502 and/or the illustrative configuration of the user device 504 depicted in FIG. 5, it should be appreciated that such operations may be implemented in connection with numerous other device configurations.

The operations described and depicted in the illustrative methods of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural properties and/or methodological acts, it is to be understood that the disclosure is not necessarily limited to the specific properties or acts described. Rather, the specific properties and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain properties, elements, and/or steps. Thus, such conditional language is not generally intended to imply that properties, elements, and/or steps are in any way required for one or more embodiments or that one or more embodiments necessarily include logic for deciding, with or without user input or prompting, whether these properties, elements, and/or steps are included or are to be performed in any particular embodiment.

That which is claimed is:

1. A method, comprising:
    receiving first data including a first text element of a digital content file, a first font size of the first text element, and a first set of page coordinates of a first bounding box that contains the first text element, the first text element including a first set of one or more characters;

receiving second data including a second text element of the digital content file, a second font size of the second text element, and a second set of page coordinates of a second bounding box containing the second text element, the second text element including a second set of one or more characters;

determining a first font size value indicative of the first font size and a second font size value indicative of the second font size;

determining, using the first set of page coordinates, a first page location value indicating a relative position of the first bounding box on a first page of the digital content file in relation to one or more other bounding boxes on the first page;

determining, using the second set of page coordinates, a second page location value indicating a relative position of the second bounding box on a second page of the digital content file in relation to one or more other bounding boxes on the second page;

determining a first distance function associated with a first set of input properties, the first distance function being a non-linear combination of a font size property and a page location property;

executing a first iteration of a clustering algorithm on the first data and the second data, wherein executing the first iteration of the clustering algorithm includes:
associating the first text element with a first cluster;
determining, by applying the first distance function to a first combination of the first font size value and the first page location value and a second combination of the second font size value and the second page location value, that a first distance between the first text element and the second text element is less than a second distance between the second text element and a third text element; and
associating the second text element with the first cluster; and executing a second iteration of the clustering algorithm on the first cluster, wherein executing the second iteration of the clustering algorithm includes:
determining, by applying a second distance function that is different from the first distance function to a first binary value indicating presence of a keyword in the first text element and a second binary value indicating absence of the keyword in the second text element, that a third distance between the first text element and the second text element is greater than a fourth distance between the second text element and the third text element; and
partitioning the first cluster into a second cluster that includes the first text element and a third cluster that includes the second text element.

2. The method of claim 1, further comprising:
determining a page location threshold value for the digital content file;
determining a first median page location value for the second cluster;
determining a second median page location value for the third cluster;
determining that the first median page location value is closer to the page location threshold value than the second median page location value; and
associating a semantic classifier with the second cluster, the semantic classifier indicating that any cluster with which the semantic classifier is associated contains a threshold number of text elements that are chapter headings.

3. The method of claim 2, further comprising:
determining that the first text element and the second text element are located on a same page of the digital content file;
determining that the first text element and the second text element together constitute a single text element; and
associating the semantic classifier with the single text element.

4. The method of claim 2, further comprising:
determining a first set of pages of the digital content file that includes any text element from the second cluster;
determining a second set of pages of the digital content file that includes any text element from the third cluster;
determining a third set of pages including each page that is in the first set of pages and the second set of pages;
determining that a number of pages in the third set of pages meet a threshold value; and
merging the second cluster and the third cluster into a single cluster.

5. A method, comprising:
receiving first data including first text content of digital content and a first value associated with the first text content, the first value corresponding to a base content property;
receiving second data including second text content of the digital content and a second value associated with the second text content, the second value corresponding to the base content property;
determining a derived content property from the base content property;
determining a third value associated with the first text content, the third value corresponding to the derived content property;
determining a fourth value associated with the second text content, the fourth value corresponding to the derived content property;
determining a first set of one or more content properties comprising the base content property;
determining a first distance function;
executing, using the first distance function and the first set of one or more content properties, a first iteration of a clustering algorithm on the first data and the second data to obtain a first cluster comprising the first text content and the second text content;
determining a second set of one or more content properties comprising the derived content property;
determining a second distance function; and
executing, using the second distance function and the second set of one or more content properties, a second iteration of the clustering algorithm on the first cluster to obtain a second cluster and a third cluster, the second cluster comprising the first text content and the third cluster comprising the second text content.

6. The method of claim 5, wherein the second set of one or more content properties further comprises the base content property, and wherein executing the second iteration of the clustering algorithm comprises:
determining, using the second distance function, a first combined value by multiplying the first value and the third value;
determining, using the second distance function, a second combined value by multiplying the second value and the fourth value; and
determining that the second cluster comprises the first text content and that the third cluster comprises the second text content based at least in part on a deviation between the first combined value and the second combined value.

7. The method of claim 5, further comprising:
determining a threshold value associated with the digital content, the threshold value corresponding to the derived content property;
generating a first rule score for the second cluster by applying a rule associated with a semantic classifier to the third value;
generating a second rule score for the third cluster by applying the rule to the fourth value;
determining that the first rule score is closer to the threshold value than the second rule score; and
associating the semantic classifier with the second cluster.

8. The method of claim 7, further comprising:
determining that a same page of the digital content contains the first text content and the second text content;
determining that the first text content and the second text content together constitute a single content element; and
associating the semantic classifier with the single content element.

9. The method of claim 5, further comprising:
determining a first set of pages of the digital content that comprises any text content in the second cluster;
determining a second set of pages of the digital content that comprises any text content in the third cluster;
determining a third set of pages comprising an intersection of the first set of pages and the second set of pages;
determining that a number of pages in the third set of pages meet a threshold value; and
merging the second cluster and the third cluster into a single cluster.

10. The method of claim 5, further comprising:
receiving a test dataset comprising test container data corresponding to multiple containers of test digital content;
selecting a set of one or more candidate content properties;
selecting a candidate distance function;
executing, using the candidate distance function and the set of one or more candidate content properties, a first iteration of the clustering algorithm on the test container data to obtain a set of clusters associated with the test digital content, each cluster in the set of clusters comprising a respective one or more of the multiple containers of the test digital content; and
determining a cluster purity score of a first cluster in the set of clusters, the first cluster purity score indicating a percentage of containers in the first cluster that are associated with a semantic classifier.

11. The method of claim 10, further comprising:
determining that the cluster purity score is greater than a respective cluster purity score associated with each other cluster in the set of clusters;
determining that the cluster purity score is less than a threshold value; and
determining the second set of one or more content properties by excluding, from the second set of one or more content properties, at least one content property from the set of one or more candidate content properties and including, in the second set of one or more content properties, at least one content property absent from the set of one or more candidate content properties.

12. The method of claim 11, wherein the threshold value is a first threshold value, the method further comprising:
determining a first set of pages in the test digital content that includes any container in any cluster of the set of clusters;
determining a second set of pages in the test digital content that includes at least one container associated with the semantic classifier;
determining a third set of pages in the test digital content, wherein each page in the third set of pages is included in the first set of pages and the second set of pages;
determining a first number of pages in the third set of pages;
determining a second number of pages in the first set of pages and the second set of pages; and
determining that a ratio of the first number of pages to the second number of pages meets a second threshold value.

13. The method of claim 10, further comprising:
determining an average cluster purity score for the set of clusters, the average cluster purity score indicating an average percentage of containers in the set of clusters that are associated with the semantic classifier;
determining a maximum page coverage value associated with a particular cluster of the set of clusters, the maximum page coverage value indicating that the particular cluster includes a minimum number of containers not associated with the semantic classifier among the set of clusters;
assigning a first weight to the average cluster purity score to obtain a weighted average cluster purity score, the first weight being associated with a particular candidate content property;
assigning a second weight to the maximum page coverage value to obtain a weighted maximum page coverage value, the second weight being associated with the particular candidate content property;
determining a combined weighted value from the weighted average cluster purity score and the weighted maximum page coverage value;
determining that the combined weighted value meets a threshold value; and
selecting the particular candidate content property for inclusion in the second set of one or more content properties.

14. A system, comprising:
at least one memory storing computer-executable instructions; and
at least one processor communicatively coupled to the at least one memory, wherein the at least one processor is configured to access the at least one memory and execute the computer-executable instructions to:
receive first data including first text content of digital content and a first value associated with the first text content, the first value corresponding to a base content property;
receive second data including second text content of the digital content and a second value associated with the second text content, the second value corresponding to the base content property;
determine a derived content property from the base content property;
determine a third property value associated with the first text content, the third value corresponding to the derived content property;

determine a fourth value associated with the second text content, the fourth value corresponding to the derived content property;

determine a first set of one or more content properties comprising the base content property;

determine a first distance function;

execute, using the first distance function and the first set of one or more content properties, a first iteration of a clustering algorithm on the first data and the second data to obtain a first cluster comprising the first text content and the second text content;

determine a second set of one or more content properties comprising the derived content property;

determine a second distance function; and execute, using the second distance function and the second set of one or more content properties, a second iteration of the clustering algorithm on the first cluster to obtain a second cluster and a third cluster, the second cluster comprising the first text content and the third cluster comprising the second text content.

15. The system of claim 14, wherein the at least one processor is further configured to execute the computer-executable instructions to:

determine a threshold value associated with the digital content, the threshold value corresponding to the derived content property;

generate a first rule score for the second cluster by applying a rule associated with a semantic classifier to the third value;

generate a second rule score for the third cluster by applying the rule to the fourth value;

determine that the first rule score is closer to the threshold value than the second rule score; and associate the semantic classifier with the second cluster.

16. The system of claim 15, wherein the at least one processor is further configured to execute the computer-executable instructions to:

determine that a same page of the digital content contains the first text content and the second text content;

determine that the first text content and the second text content together constitute a single content element; and associate the semantic classifier with the single content element.

17. The system of claim 14, wherein the at least one processor is further configured to execute the computer-executable instructions to:

determine a first set of pages of the digital content that comprises any text content in the second cluster;

determine a second set of pages of the digital content that comprises any text content in the third cluster;

determine a third set of pages comprising an intersection of the first set of pages and the second set of pages;

determine that a number of pages in the third set of pages meet a threshold value; and merge the second cluster and the third cluster into a single cluster.

18. The system of claim 14, wherein the at least one processor is further configured to execute the computer-executable instructions to:

receive a test dataset comprising test container data corresponding to multiple containers of test digital content;

select a set of one or more candidate content properties;

select a candidate distance function;

execute, using the candidate distance function and the set of one or more candidate content properties, a first iteration of the clustering algorithm on the test container data to obtain a set of clusters associated with the test digital content, each cluster in the set of clusters comprising a respective one or more of the multiple containers of the test digital content; and determine a cluster purity score of a first cluster in the set of clusters, the first cluster purity score indicating a percentage of containers in the first cluster that are associated with a semantic classifier.

19. The system of claim 18, wherein the at least one processor is further configured to execute the computer-executable instructions to:

determine that the cluster purity score is greater than a respective cluster purity score associated with each other cluster in the set of clusters;

determine that the cluster purity score is less than a threshold value; and determine the second set of one or more content properties by excluding, from the second set of one or more content properties, at least one content property from the set of one or more candidate content properties and including, in the second set of one or more content properties, at least one content property absent from the set of one or more candidate content properties.

20. The system of claim 19, wherein the threshold value is a first threshold value, wherein the at least one processor is further configured to execute the computer-executable instructions to:

determine a first set of pages in the test digital content that includes any container in any cluster of the set of clusters;

determine a second set of pages in the test digital content that includes at least one container associated with the semantic classifier;

determine a third set of pages in the test digital content, wherein each page in the third set of pages is included in the first set of pages and the second set of pages;

determine a first number of pages in the third set of pages;

determine a second number of pages in the first set of pages and the second set of pages; and determine that a ratio of the first number of pages to the second number of pages meets a second threshold value.

* * * * *